United States Patent
Naoi et al.

(10) Patent No.: US 7,099,251 B2
(45) Date of Patent: Aug. 29, 2006

(54) METHOD OF CONTROLLING LASER POWER AND OPTICAL DISK PLAYER

(75) Inventors: Hiroki Naoi, Nagano (JP); Hiroyuki Nakamura, Nagano (JP); Wataru Mashima, Nagano (JP)

(73) Assignee: Shinano Kenshi Kabushiki Kaisha, Nagano (JP)

( * ) Notice: Subject to any disclaimer, the term of this patent is extended or adjusted under 35 U.S.C. 154(b) by 618 days.

(21) Appl. No.: 10/259,412

(22) Filed: Sep. 30, 2002

(65) Prior Publication Data

US 2003/0072235 A1 Apr. 17, 2003

(30) Foreign Application Priority Data

Oct. 15, 2001 (JP) .............................. 2001-316742
Apr. 9, 2002 (JP) .............................. 2002-106151

(51) Int. Cl.
*G11B 7/00* (2006.01)
(52) U.S. Cl. ................. 369/53.13; 369/53.3; 369/53.43
(58) Field of Classification Search ..................... None
See application file for complete search history.

(56) References Cited

U.S. PATENT DOCUMENTS

| | | | | |
|---|---|---|---|---|
| 5,625,616 | A * | 4/1997 | Koike et al. | 369/53.26 |
| 6,278,667 | B1 * | 8/2001 | Belser | 369/13.01 |
| 6,442,115 | B1 * | 8/2002 | Shimoda et al. | 369/47.28 |
| 2001/0038587 | A1 * | 11/2001 | Shumura et al. | 369/53.18 |
| 2002/0021641 | A1 * | 2/2002 | Miyabata et al. | 369/53.26 |
| 2002/0036962 | A1 * | 3/2002 | Masaki et al. | 369/47.53 |
| 2002/0064114 | A1 * | 5/2002 | Sakata et al. | 369/53.26 |
| 2002/0181365 | A1 * | 12/2002 | Nakajo | 369/47.53 |

* cited by examiner

*Primary Examiner*—Andrea Wellington
*Assistant Examiner*—Lixi Chow
(74) *Attorney, Agent, or Firm*—Birch, Stewart, Kolasch & Birch, LLP

(57) ABSTRACT

A method of controlling a laser power of a zone Constant Linear Velocity (CLV) type optical disk player, in which a linear velocity of writing data is accelerated, by stages, toward an outer edge of an optical disk. The method includes changing a laser power for writing data onto the optical disk when the linear velocity is changed.

4 Claims, 10 Drawing Sheets

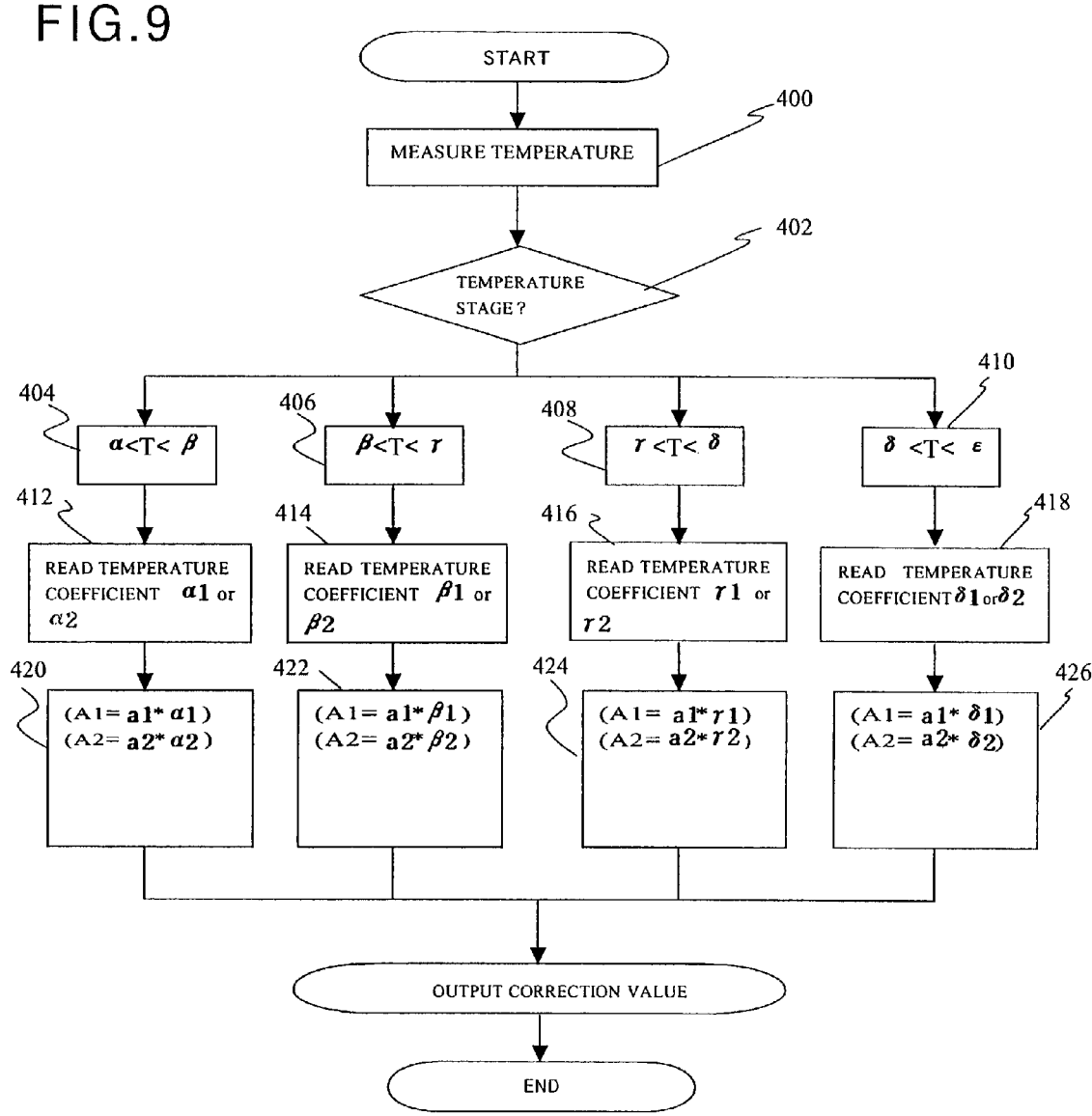

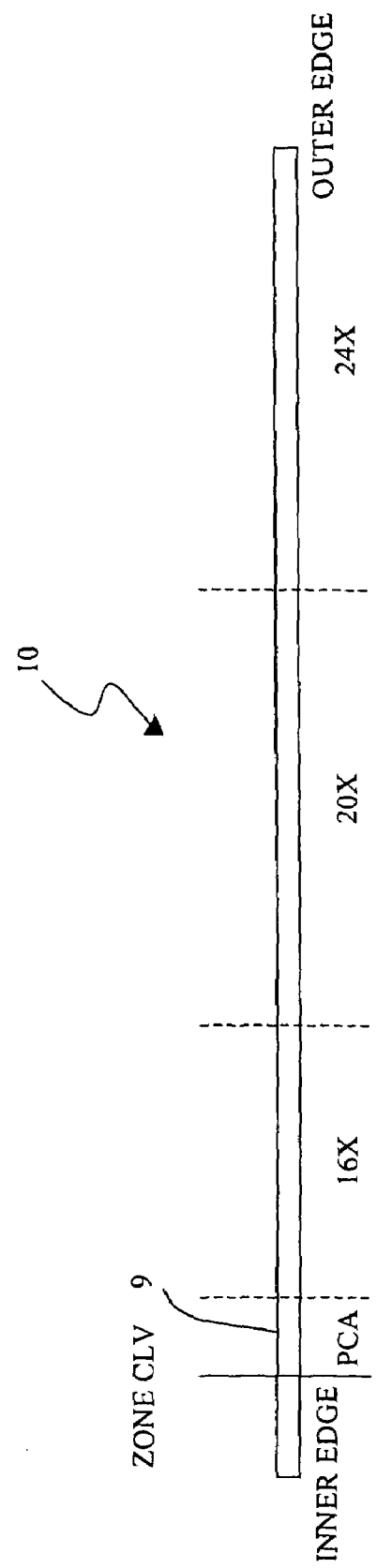

METHOD OF CONTROLLING LASER POWER AND OPTICAL DISK PLAYER

BACKGROUND OF THE INVENTION

The present invention relates to a method of controlling a laser power for writing data on an optical disk, e.g., CD-R (Compact Disk-Recordable), CD-RW (Compact Disk-Re-Writable), and an optical disk player employing the method.

Many types of optical disk players, e.g., CD-R players, CD-RW players, have been used for writing data on optical disks.

In some optical disk players, linear velocity for writing data is maintained at a prescribed velocity so as to write data on an optical disk with fix pit density. This control manner is called CLV (Constant Linear Velocity). In the CLV manner, data are written in an inner part of the optical disk with a high rotational speed of the optical disk; and data are written in an outer part of the optical disk with a low rotational speed thereof.

These days, high speed writing is required. To accelerate the writing speed by the CLV manner, the rotational speed of the optical disk is merely accelerated, so that the rotational speed is too fast to write data in the inner part of the optical disk. Namely, data cannot be securely written in the inner part of the optical disk.

This problem of the CLV manner was solved by a zone CLV manner, in which data can be written in the inner part of the optical disk without over-accelerating the rotational speed of the optical disk and total writing time can be shortened.

In the zone CLV manner, data are written in the inner part of the optical disk with fixed low linear velocity, so the rotational speed for writing data in the inner part is equal to that of the CLV manner. The rotational speed of the optical disk is accelerated, by stages, with moving a data writing part toward an outer edge of the optical disk.

The zone CLV will be explained with reference to FIG. 10.

In the example shown in FIG. 10, data are written in an inner part of an optical disk 10 with 16× linear velocity; after the laps of prescribed time, data are written in an intermediate part thereof with 20× linear velocity; and after the laps of another prescribed time, data are written in an outer part thereof with 24× linear velocity.

As described above, the rotational speed for writing data in the inner part is equal to a proper speed of the CLV manner, so total writing time can be shortened without writing errors in the inner part.

In the conventional optical disk player, a data writing test or an optimum power control (OPC) test is executed in a power calibration area (PCA) 9 (see FIG. 10), which is located in an inner most part of a recording face of the optical disk, when data are written on the optical disk so as to adjust laser power for writing data to optimum power.

A method of setting the laser power of the optical disk will be explained.

Firstly, the optical disk player reads an absolute time in pregroove (ATIP) from the optical disk. A manufacturer of the optical disk has previously written data of the optical disk, e.g., a type of the disk, in the ATIP.

The optical disk player reads the data of the disk, e.g., the name of the manufacturer, a type of the optical disk, from the ATIP, then retrieves recommended laser power of the disk from a data table on the basis of the data. The data table has been previously stored in the optical disk player.

The optical disk player executes the OPC test with increasing and decreasing the laser power with respect to the recommended laser power. The written test data are read so as to check up-down symmetry of waveforms of light intensity of reflected laser beams. The laser power whose up-down symmetry is the best of all is selected and set as the optimum laser power of the disk.

The optical disk player writes data with the optimum laser power determined by the OPC test in the innermost PCA 9.

However, in the optical player employing the zone CLV manner, the linear velocity for writing data in the outer part is accelerated, so even if the laser power is determined by the OPC test in the PCA 9 located in the innermost part of the optical disk 10, the determined power is not optimum in the outer part thereof.

In the example shown in FIG. 10, the laser power is determined, by the OPC test, with 16× linear velocity. But data are written in the intermediate part with 20× linear velocity and written in the outer part with 24× linear velocity. Optimum laser power for 20× and 24× linear velocity are greater than that for 16× linear velocity.

Even if the laser power shifts from the optimum laser power, data can be written with the shifted power. However, the actual laser power is not optimum, so quality and reliability of written data must be low. In some cases, the written data cannot be read.

SUMMARY OF THE INVENTION

An object of the present invention is to provide a method of controlling laser power for writing data on an optical disk, which is capable of improving quality and reliability of the written data.

Another object is to provide an optical disk player employing said method.

The inventors found that quality and reliability of written data can be improved by changing laser power when the linear velocity is changed. Further, they could properly adjust the laser power by adding a predetermined correction value to the laser power when the linear velocity is changed.

To achieve the objects, the method of controlling an optical disk player, in which linear velocity of writing data is accelerated, by stages, toward an outer edge of an optical disk, is characterized in, that a laser power for writing data is changed when the linear velocity is changed. With this method, the laser power for writing data is changed when the linear velocity is changed, so quality and reliability of the written data can be improved.

In the method, a correction value of the laser power, which has been previously determined, may be added to the laser power when the linear velocity is changed by stages. With this structure, data can be written with laser power close to optimum laser power, so that quality and reliability of the written data can be further improved. Further, no further OPC test in a PCA of the optical disk is required.

The laser power may be changed in a part, in which the linear velocity is accelerated for the zone CLV control, by the steps of returning an optical pick-up to the PCA and executing the OPC test with the changed linear velocity so as to set the optimum laser power. However, if the OPC test is executed each time the linear velocity is changed, test data must be written in the PCA with high speed, e.g., 20× or 24× linear velocity. By executing the OPC test at such a high speed, Vibration and noise of the optical disk occur, and the optical disk will be damaged. In this method, the laser power is increased by adding the correction value to the laser power, so no further OPC test is required, and damage of the optical disk can be prevented.

Another method is characterized in, that temperature around a laser diode, which irradiates a laser beam, is detected when the linear velocity is changed, and that a correction value of the laser power corresponding to the detected temperature is added to the laser power when the linear velocity is changed.

Even if electric voltage inputted to the laser diode is fixed, output laser power is varied according to temperature. Wavelength of the laser beam irradiated from the laser diode is also varied according to temperature. The variation of the wavelength is 1–3 Å/° C., so it does not badly influence to writing function of the optical disk player. But efficiency of writing data on the optical disk is varied, so that quality and reliability of written data are made lower. By employing this method, the correction value of the laser power corresponding to the detected temperature around the laser diode is added to the laser power when the linear velocity is changed, so that the method can follow the variation of the wavelength caused by variation of the temperature. In spite of the high speed zone CLV manner, quality and reliability of the written data can be improved.

In the method, the correction value may be calculated by multiplying a standard correction value, which has been previously determined on the basis of a type of the optical disk without considering temperature, by a temperature coefficient, which has been previously determined, when the linear velocity is changed. With this method, the laser power can be securely adjusted with respect to the variation of temperature.

The optical disk player of the present invention has following structures.

The optical disk player, in which linear velocity of writing data is accelerated, by stages, toward an outer edge of an optical disk, comprises: a laser diode for irradiating a laser beam; and laser control means for changing a laser power of the laser diode for writing data when the linear velocity is changed.

In the optical disk player, the laser power for writing data is changed when the linear velocity is changed, so quality and reliability of the written data can be improved.

In the disk player, a correction value of the laser power, which has been previously determined, may be added to the laser power when the linear velocity is changed. With this structure, data can be written by optimum laser power without executing further OPC test. Therefore, data can be written in a short time, damage of the optical disk can be prevented, and quality and reliability of the written data can be improved.

The disk player may further comprise memory means for previously storing a plurality of the correction values of the laser power, the laser control means may detect a type of the optical disk when the optical disk is set in the optical disk player, and the laser control means may read the proper correction value from the memory means on the basis of the type of the optical disk and add the proper correction value to the laser power when the linear velocity is changed. With this structure, the optimum laser power can be determined on the basis of the type of optical disk, so quality and reliability of the written data can be further improved.

In the disk player, a plurality of the correction values corresponding to the types of the optical disk and temperature for writing data may be stored in the memory means as a data table. Even if electric voltage inputted to the laser diode is fixed, output laser power is varied according to temperature. With this structure, the correction values are determined on the basis of the type of disk and the temperature, so the optimum laser power can follow variation of the temperature. Therefore, quality and reliability of the written data can be improved.

In the disk player, the laser control means may detect the temperature on the basis of a waveform of light intensity of a reflected beam from the optical disk, and the correction value corresponding to the detected type of the optical disk and the detected temperature may be added to the laser power when the linear velocity is changed. With this structure, the temperature can be properly detected, and the laser power can be properly adjusted on the basis of the detected temperature.

Another optical disk player comprises: a laser diode for irradiating a laser beam; a sensor for measuring temperature around the laser diode; and laser control means for changing a laser power of the laser diode for writing data by adding a correction value of the laser power corresponding to the measured temperature to the laser power when the linear velocity is changed.

In this optical player, real time temperature around the laser diode can be measured by the sensor. Since the correction value of the laser power corresponding to the measured temperature is added to the laser power when the linear velocity is changed, the corrected laser power corresponds to the changed linear velocity. In spite of the high speed zone CLV manner, quality and reliability of the written data can be improved.

The optical disk player may further comprise: first memory means for storing standard correction values, which have been previously determined on the basis of types of the optical disk without considering temperature; second memory means for storing temperature coefficients, which have been previously determined so as to correct the standard correction values according to the measured temperature; and means for calculating the correction value by multiplying the standard correction value, which has been read from the first memory means, by the temperature coefficient, which has been read from the second memory means.

BRIEF DESCRIPTION OF THE DRAWINGS

Embodiments of the present invention will now be described by way of examples and with reference to the accompanying drawings, in which:

FIG. 9 is a flow chart showing action of calculating correction values; and

FIG. 10 is an explanation view showing an optical disk, on which data are written by zone CLV manner.

DETAILED DESCRIPTION OF THE EMBODIMENTS

Preferred embodiments of the present invention will now be described in detail with reference to the accompanying drawings.

First Embodiment

Figure 2:
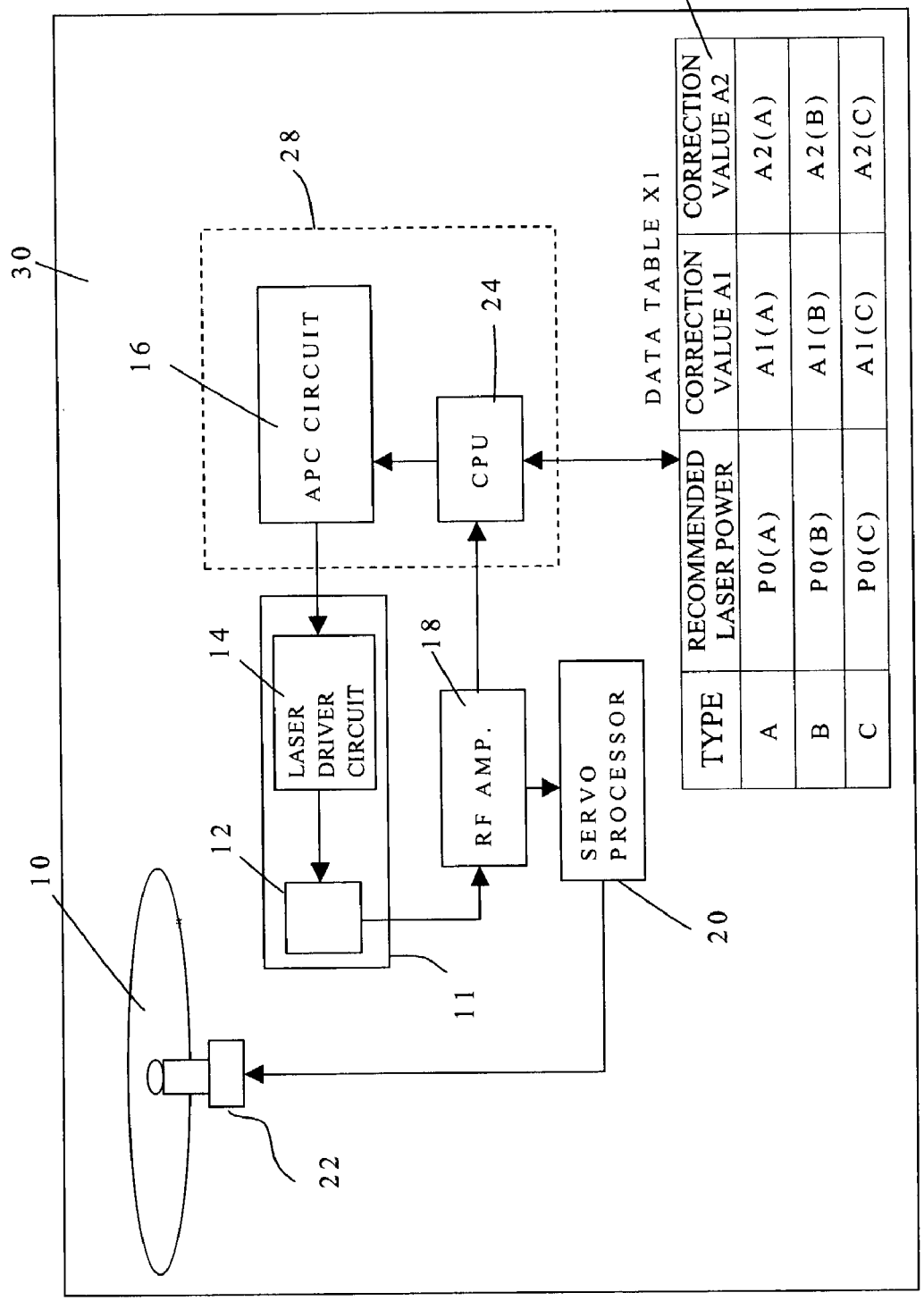
FIG. 2 is a block diagram of an optical disk player of a first embodiment of the present invention.
Figure 3:
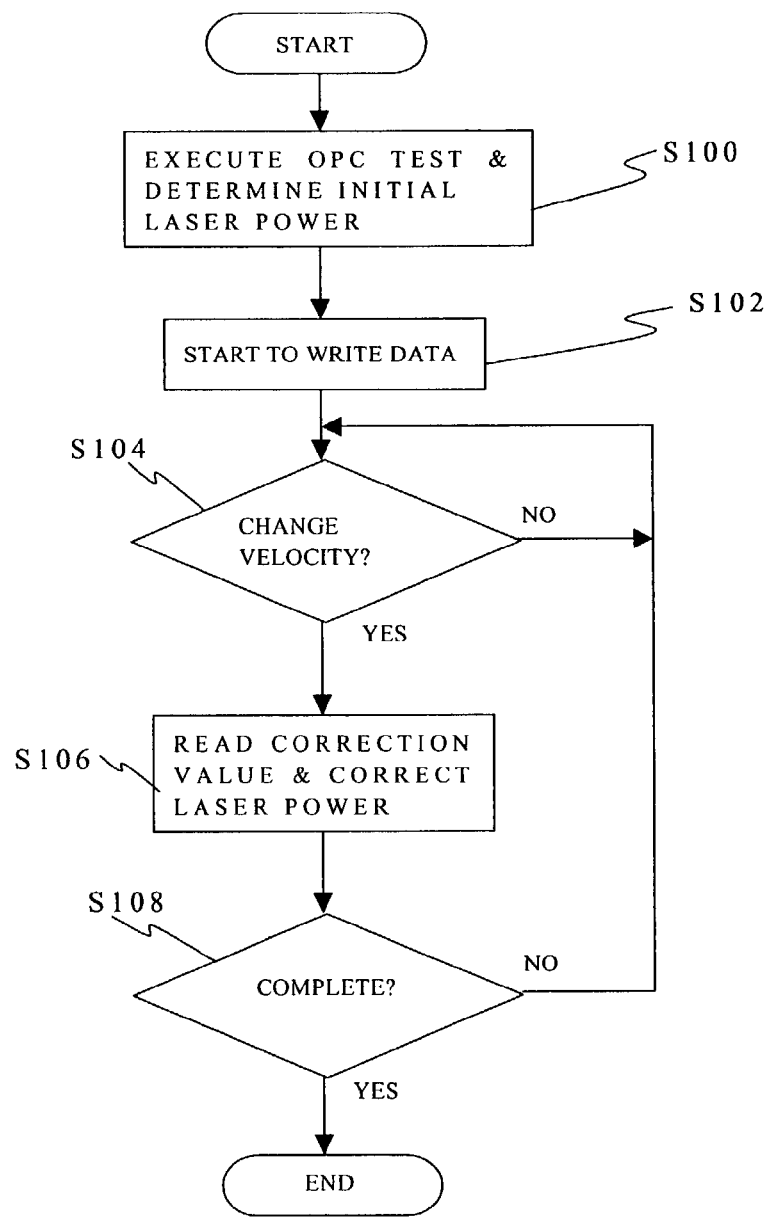
FIG. 3 is a flow chart showing action of the optical disk player of the first embodiment.

A first embodiment will be explained with reference to FIGS. 1–3.

Firstly, action of an optical disk player of the first embodiment will be explained with reference to FIG. 1.

Figure 1:
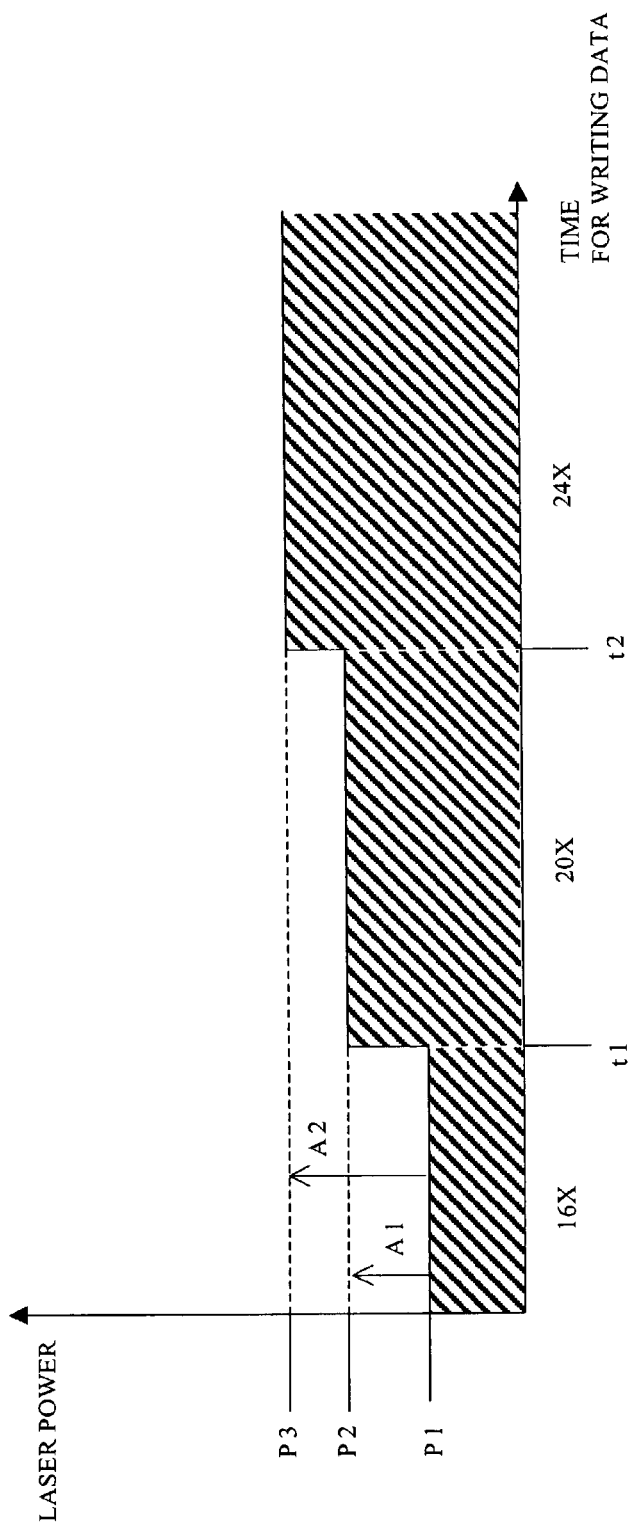
FIG. 1 is a graph showing a relationship between laser power and writing time in the optical disk player of the present invention.

In FIG. 1, a horizontal axis of is time for writing data; a vertical axis is laser power for writing data.

In the zone CLV manner, as described in BACKGROUND OF THE INVENTION, the linear velocity for writing data on an optical disk is accelerated by stages.

In the present embodiment, firstly data are written with 16× linear velocity. The laser power is P1. The value P1 is determined by the OPC test, which has been executed before writing data.

After the laps of prescribed time t1 from a start, the linear velocity is changed to 20× linear velocity. At that time, the laser power is changed to P2 corresponding to 20× linear velocity. The laser power p1 plus a correction value A1 is the laser power P2.

After the laps of prescribed time t2 from the start, the linear velocity is changed to 24× linear velocity. At that time, the laser power is changed to P3 corresponding to 24× linear velocity. The laser power p1 plus a correction value A2 is the laser power P2.

As described above, the linear velocity for writing data is accelerated by stages, and the laser power is also increased by stages so as to write data with optimum laser power.

Next, the structure of the optical disk player will be explained with reference to FIG. 2.

The optical disk player 30 is capable of writing data on an optical disk 10, e.g., CD-R, CD-RW.

The optical disk player 30 includes: a laser diode 12 irradiating a laser beam to an optical disk 10; a laser driver circuit 14 supplying electric current to the laser diode 12. The laser diode 12 and the laser driver circuit 14 are built in an optical pick-up 11 and moved from an inner part to an outer part of the optical disk 10, together with the optical pick-up 11, so as to write data on the optical disk 10. The laser diode 12 is connected to the laser driver circuit 14 so as to control laser power of the laser diode 12.

An auto power control (APC) circuit 16, which is capable of adjusting electric voltage inputted to the laser driver circuit 14, is connected to the laser driver circuit 14. The APC circuit 16 adjusts the electric voltage inputted to the laser driver circuit 14 so as to maintain prescribed laser power. Laser power of the laser diode 12 is controlled by adjusting current intensity of the electric current passing through the laser diode 12. The current intensity is adjusted by the laser driver circuit 14.

A reflected beam reflected from the optical disk 10 is received by a photo sensor (not shown) built in the optical pick-up 11. The photo sensor outputs signals corresponding to signals included in the reflected beam. The output signals of the photo sensor are sent to and amplified in an RF amplifier 18.

The signals amplified by the RF amplifier 18 are sent to a servo processor 20. The servo processor 20 servo-controls rotation of a spindle motor 22, focusing and tracking of the optical pick-up 11, etc. on the basis of the signals.

The signals amplified by the RF amplifier 18 are sent to a CPU 24. The CPU 24 always monitors level of the signals and controls the APC circuit 16. Action and function of the CPU 24 is controlled on the basis of control programs. The control programs have been previously stored in a memory unit (not shown) as firmware.

Memory means 26, e.g., ROM, is connected to the CPU 24. The memory means 26 includes a data table X1. Types of optical disks and recommended laser power and laser power correction values corresponding to the types of optical disks are stored in the data table X1 as table data.

The CPU 24 reads the table data from the data table X1, determines the laser power for the OPC test, and changes the laser power when the linear velocity is changed on the basis of the table data.

Note that, in the first embodiment, the CPU 24 and the APC circuit 16 constitutes laser control means 28.

Contents of the data table will be explained.

The data table X1 was prepared in a factory before shipment. The data table X1 includes the recommended laser power P0(A)–P0(C) corresponding to the types of optical disks A–C. The recommended power P0(A)–P0(C) are optimum laser power for the OPC test. Actually, writing data is not started with the laser power P0. The OPC test has been explained in BACKGROUND OF THE INVENTION, so explanation will be omitted. Note that, in the OPC test, the laser power P0(A)–P0(C) are used as standard power, and the laser power P1 is defined as initial laser power for writing data (see FIG. 1).

Note that, the recommended laser power P0(A)–P0(C) depend on manufactures of the optical disks, characteristics of optical disks, etc. In FIG. 3, only three types A–C are shown as examples, but many types of optical disks are provided to markets from many manufactures.

The correction values A1(A)–A1(C), which will be added to the laser power P1 when the linear velocity is changed by the zone CLV manner and which respectively correspond to the types A–C, have been previously determined. The laser power P1 plus the correction value A1 is the corrected laser power P2 (see FIG. 1).

Similarly, correction values A2(A)–A2(C) have been previously determined. The laser power P1 plus the correction value A2 is the corrected laser power P3 (see FIG. 1).

The correction values A1(A)–A1(C) and A2(A)–A2(C) have been previously determined and stored in the data table X1 before shipment. In data table X1, the correction values for only three types A–C are shown as examples, but other examples may be stored therein.

Action of the optical disk player 30 will be explained with reference to a flow chart of FIG. 3.

At a step S100, the CPU 24 reads data written in an ATIP of the optical disk 10 by the optical pick-up 11 when the optical disk 10 is set in the optical disk player 30 so as to write data thereon.

Then, the CPU 24 reads the recommended laser power P0 corresponding to the type of the optical disk 10 from the data table X1.

The CPU 24 executes the OPC test with the laser power P0 so as to determine the initial laser power P1 for writing data.

At a step S102, the CPU 24 starts to write data on the optical disk 10 with the laser power P1. At that time, the linear velocity is 16× velocity.

At a step S104, if the linear velocity is not changed, data are written with the present laser power P1. If the linear velocity is changed, the CPU 24 goes to a step S106.

At the step S106, the CPU 24 reads the correction value A1 or A2 corresponding to the type of the optical disk 10 from the data table X1. If the linear velocity is changed from 16× to 20×, the correction value A1 is read; if the linear velocity is changed from 20× to 24×, the correction value A2 is read.

Note that, the values A1 and A2 have been defined according to the type of the optical disk. The type of the optical disk 10 was known when the ATIP data were read, so the values A1 and A2 were selected from the correction values A1(A)–A1(C) and A2(A)–A2(C).

The CPU 24 controls the APC circuit 16 to add the correction value A1 or A2 to the laser power which has been determined before changing the linear velocity. If the linear velocity is changed from 16× to 20×, the correction value A1 is added to the laser power P1; if the linear velocity is changed from 20× to 24×, the correction value A2 is added to the laser power P1. When the linear velocity is changed, data are written with the corrected laser power.

At a step S108, if writing data is completed, the CPU 24 stops the action; if writing data is not completed, the CPU 24 goes to the step S104.

Second Embodiment

A second embodiment will be explained with reference to FIGS. 4–6. Note that, structural elements explained in the first embodiment are assigned the same symbols, and explanation will be omitted.

Firstly, action of the optical disk player of the second embodiment will be explained.

In the second embodiment, the laser power correction values are determined according to temperature around the laser diode 12.

Temperature of the laser diode 12 is made higher, the laser power of the laser diode 12 is made smaller. On the other hand, the temperature of the laser diode 12 is made lower, the laser power of the laser diode 12 is made greater.

In the second embodiment, fixed correction values are not merely added to the laser power when the linear velocity is changed. To precisely control the laser power in the zone CLV manner, correction values corresponding to temperature around the laser diode 12 are added. In the present embodiment, the correction values correspond to temperature of the OPC test. By using the correction values corresponding to the temperature, data can be written with optimum laser power, so that quality and reliability of written data can be improved.

In the second embodiment, the correction values correspond to three temperature stages: Low Temperature, Ordinary Temperature and High Temperature.

Number of the temperature stages are not limited to the three stages. It may be three or more to correspond many temperature stages. Further, the power correction values may be prepared for not only the temperature stages but also detected temperature.

Setting the correction values corresponding to the temperature will be explained with reference to FIG. 4.

While the OPC test, the laser power of the laser diode is varied, between P01 and P02 with respect to the standard power P0, and degree of up-down symmetry "β" of the waveform of the reflected beam is measured. The graph of FIG. 4 shows the relationship between the up-down symmetry "β" and the laser power.

As described in BACKGROUND OF THE INVENTION, the optical disk player executes the OPC test, in the PCA of the optical disk, with increasing and decreasing the laser power with respect to the recommended laser power P0, between the laser power P01 and P02. The written test data are read so as to check the up-down symmetry "β" of waveforms of light intensity of reflected laser beams. The laser power whose up-down symmetry is the best of all is selected and set as the optimum laser power P1, and data are written with the laser power P1.

In the present embodiment, the temperature is measured by detecting variation of the up-down symmetry "β". Namely, the temperature is know from inclination of graph shown in FIG. 4.

The inclination of the graph of Low Temperature is greater than that of Ordinary Temperature; the inclination of the graph of High Temperature is smaller than that of Ordinary Temperature. This characteristics have been previously known. Therefore, in the present embodiment, the temperature is detected by measuring the variation of the up-down symmetry "β", which is caused by varying the laser power during the OPC test.

The inclination "k" can be known by following formula: k=(β02−β01)/(P02−P01) Note that, the variation of the up-down symmetry "β" is from β01 to β02.

Figure 4:
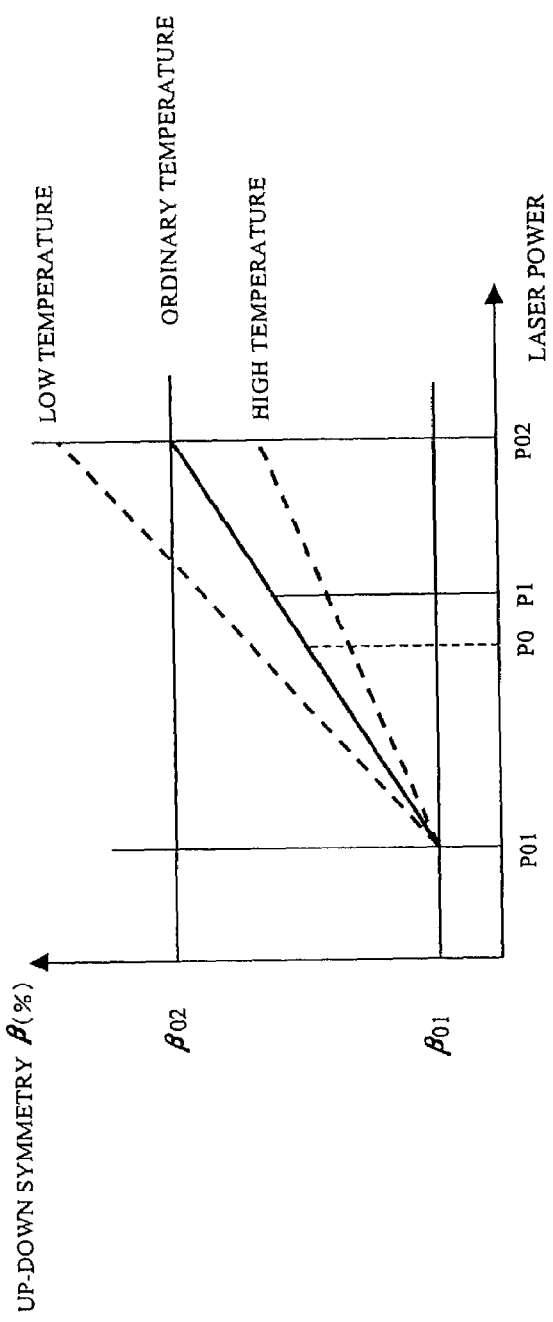
FIG. 4 is a graph showing a relationship between up-down symmetry and variation of laser power.

Then, the inclination "k" of the graph shown in FIG. 4 is compared with comparative values "x" and "y". The comparative values "x" and "y" have been previously stored in a memory.

In the case of k>y, the temperature is judged as the Low Temperature; in the case of x<k<y, the temperature is judged as the Ordinary Temperature; and in the case of k<x, the temperature is judged as the High Temperature. This judgment by the CPU 24 is based on control programs, which have been previously stored.

Figure 5:
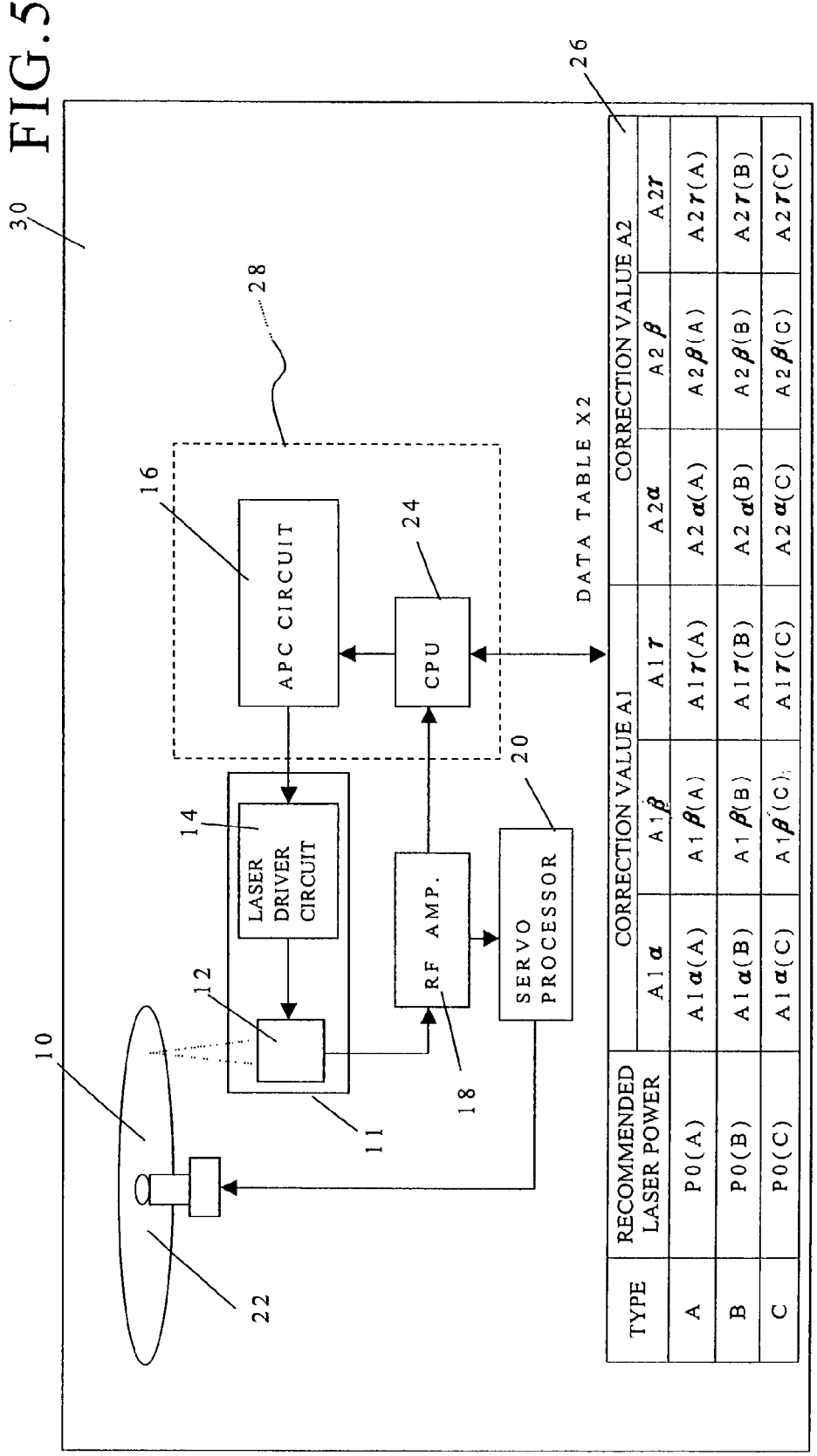
FIG. 5 is a block diagram of an optical disk player of a second embodiment of the present invention.
Figure 6:
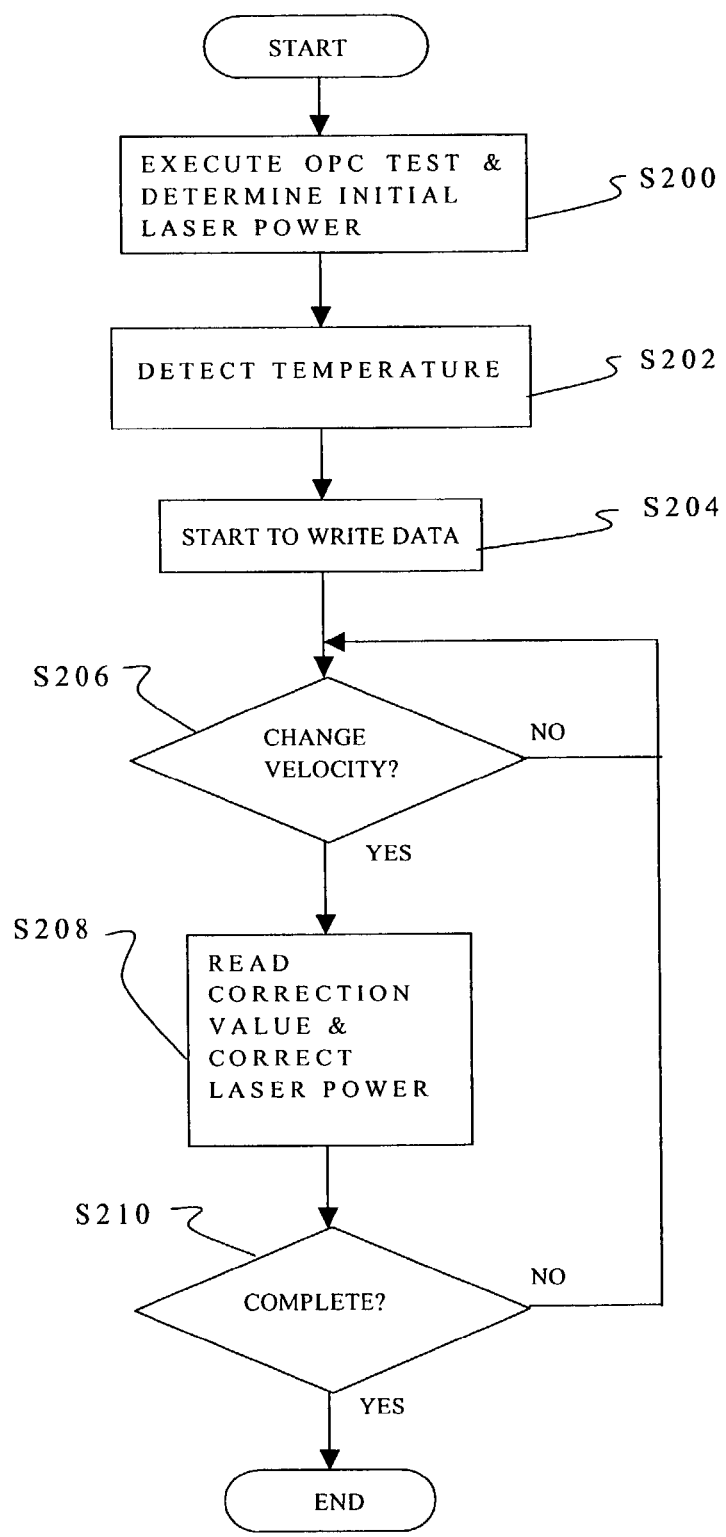
FIG. 6 is a flow chart showing action of the optical disk player of the second embodiment.

A block diagram of the optical disk player 30 of the second embodiment is shown in FIG. 5. Note that, structural elements explained in the first embodiment are assigned the same symbols, and explanation will be omitted. Thus, a data table X2 stored in the memory means 26 will be explained.

The data table X2 was prepared in a factory before shipment. The data table X2 includes the recommended laser power P0(A)–P0(C) corresponding to the types of optical disks A–C. The recommended power P0(A)–P0(C) are optimum laser power for the OPC test.

Correction values A1 and A2, which will be added to the laser power P1 when the linear velocity is changed by the zone CLV manner and which respectively correspond to the types A–C, have been previously determined and stored in the data table X2. The laser power P1 plus the correction value A1 is the corrected laser power P2

The correction values A1 are divided into three values: A1α, A1β and A1γ. The value A1α, A1β or A1γ is selected on the basis of the temperature, which is known by the variation of the up-down symmetry "β" caused by varying the laser power during the OPC test.

The laser power P1 plus the correction value A1α, A1β or A1γ is the corrected laser power P2 (see FIG. 1).

Further, the laser power P1 plus a correction value A2α, A2β or A2γ is the corrected laser power P3 (see FIG. 1).

The correction values A2 are also divided into three values: A2α, A2β or A2γ. The value A2α, A2β or A2γ is also selected on the basis of the temperature, which is known by the variation of the up-down symmetry "β" caused by varying the laser power during the OPC test.

The correction values A1 and A2 was stored in the data table X2 of the memory 26 before shipment.

Successively, control of the optical disk player 30 having the data table X2 will be explained with reference to a flow chart of FIG. 6.

Firstly, at a step S200, the CPU 24 reads data, e.g., the type of optical disk, recorded in an ATIP of the optical disk 10 by the optical puck-up 11, when the optical disk 10 is set to write data thereon. The data in the ATIP were wrote by a manufacturer before shipment.

Then, the CPU 24 reads the recommended laser power P0 corresponding to the type of the optical disk 10 from the data table X2.

The CPU 24 executes the OPC test with the laser power P0 so as to determine the initial laser power P1 for writing data.

At a step S202, the CPU 24 calculates the inclination value "k" of the up-down symmetry β. The CPU 24 compares the inclination "k" with the predetermined values "x" and "y" to detect the current temperature around the laser diode 12.

In the case of k>y, the temperature is judged as the Low Temperature; in the case of x<k<y, the temperature is judged as the Ordinary Temperature; and in the case of k<x, the temperature is judged as the High Temperature.

At a step S204, the CPU 24 starts to write data on the optical disk 10 with the laser power P1. At that time, the linear velocity is 16× velocity.

At a step S206, if the linear velocity is not changed, data are written with the present laser power P1. If the linear velocity is changed, the CPU 24 goes to a step S208.

At the step S208, the CPU 24 reads the correction value A1 or A2 corresponding to the type of the optical disk 10 from the data table X2. If the linear velocity is changed from 16× to 20× on the basis of the temperature detected at the step S02, one of the correction values A1α(A)–A1α(C), A1β(A)–A1β(C) and A1γ(A)–A1γ(C) is selected; if the linear velocity is changed from 20× to 24×, one of the correction values A2α(A)–A2α(C), A2β(A)–A2β(C) and A2γ(A)–A2γ(C) is selected.

The CPU 24 controls the APC circuit 16 to add the selected correction value to the laser power which has been determined before changing the linear velocity.

At a step S210, if writing data is completed, the CPU 24 stops the action; if writing data is not completed, the CPU 24 goes to the step S206.

Third Embodiment

A third embodiment will be explained with reference to FIGS. 7–9. Note that, structural elements explained in the foregoing embodiments are assigned the same symbols, and explanation will be omitted.

In the third embodiment, the correction values A1 and A2 (see FIG. 1) are calculated from standard correction values a1, a2, b1, b2, c1 and c2, which have been previously determined on the basis of types of the optical disk without considering temperature, and temperature coefficients α1, α2, β1, β2, γ1, γ2, δ1 and δ2, which have been previously determined so as to correct the standard correction values according to the measured temperature.

In a general laser diode, even if the laser diode irradiates with prescribed laser power, writing efficiency under the High Temperature is lower than that under the Ordinary Temperature due to variation of wavelength. On the other hand, writing efficiency under the Low Temperature is higher than that under the Ordinary Temperature due to variation of wavelength.

In the present embodiment, when the linear velocity is changed by the zone LCV manner, the laser power is not corrected by fixed correction values. The laser power is corrected by adding the correction values corresponding to the current temperature. With this structure, data can be written with optimum laser power, so that quality of written data can be further improved.

Figure 7:
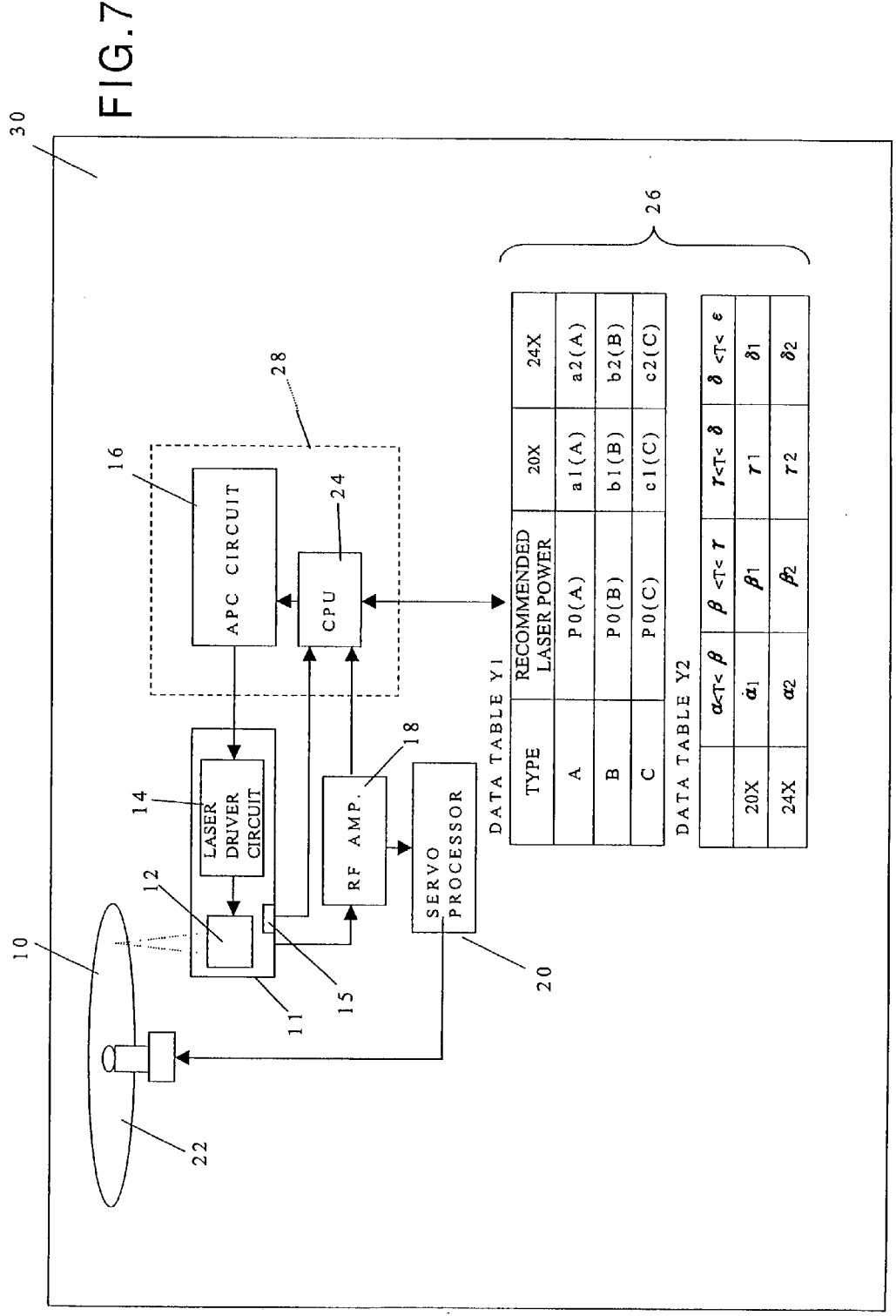
FIG. 7 is a block diagram of an optical disk player of a third embodiment of the present invention.

FIG. 7 is a block diagram of the optical disk player of the third embodiment.

The feature of the third embodiment is a thermo sensor 15 which real-timely measures the present temperature around the laser diode 12. A thermistor 15, which is an example of the thermo sensor, is provided near the laser diode 12 in the optical pick-up 11. Note that, the thermo sensor 15 is not limited to the thermistor.

The thermo sensor 15 measures the temperature around the laser diode 12 and sends signals indicating the measured temperature to the CPU 24. Electric resistance of the thermistor 15 is varied by variation of the temperature around the themistor 15, so the CPU 24 can measure the temperature around the laser diode 12 by detecting variation of electric voltage inputted to the thermistor 15.

Memory means 26, e.g., ROM, is connected to the CPU 24. The memory means 26 includes data tables Y1 and Y2.

The CPU 24 reads data from the data table Y1 and Y2, determines the laser power for the OPC test, and changes the laser power when the linear velocity is changed on the basis of the table data.

Firstly, contents of the data table Y1 will be explained.

The data table Y1 was prepared in a factory before shipment. The data table Y1 includes the recommended laser power P0(A)–P0(C) corresponding to the types of optical disks A–C. The recommended power P0(A)–P0(C) are optimum laser power for the initial OPC test. These data were already explained, so explanation will be omitted.

The standard correction value a1, b1 or c1 will be added to the laser power P1 when the linear velocity is changed by the zone CLV manner. The standard correction value a2, b2 or c2 will be added to the laser power P1 when the linear velocity is further changed. The standard correction values respectively correspond to the types A–C of the optical disk 10, and they have been previously determined and stored in the data table Y1.

In the present embodiment, the standard correction value a1, b1 or c1 is added to the laser power P1 when the linear velocity is changed from 16× to 20× without considering the temperature around the laser diode 12; the standard correction value a2, b2 or c2 is added to the laser power P1 when the linear velocity is changed from 20× to 24× without considering the temperature.

The memory means 26 includes another data table Y2. The temperature coefficients α1, α2, β1, β2, γ1, γ2, δ1 and δ2 are stored in the data table Y2. The coefficients α1, β1, γ1 and δ1 are used when the linear velocity is changed from 16× to 20×; the coefficients α2, β2, γ2 and δ2 are used when the linear velocity is changed from 20× to 24×. By multiplying the standard correction value by the temperature coefficient, the standard correction value can be corrected to the optimum power correction value corresponding to the temperature.

In the present embodiment, the temperature "T" around the laser diode 12 is divided into three stages: α<T<β; β<T<γ; γ<T<δ; and δ<T<ε. The temperature coefficients respectively correspond to that stages. Note that, the values α, β, γ, δ and ε are predetermined fixed values.

To simplify the drawing, the types of the disk 10 are omitted. Actually, the temperature coefficients in the data table Y2 correspond to the types of the disk as well as the data in the data table Y1.

The table data in the data table Y1 and Y2 were also written by a manufacturer before shipment.

Control of the optical disk player 30 of the third embodiment will be explained with reference to flow charts of FIGS. 8 and 9. Note that, in this example, the type of the disk 10 is "A".

Figure 8:
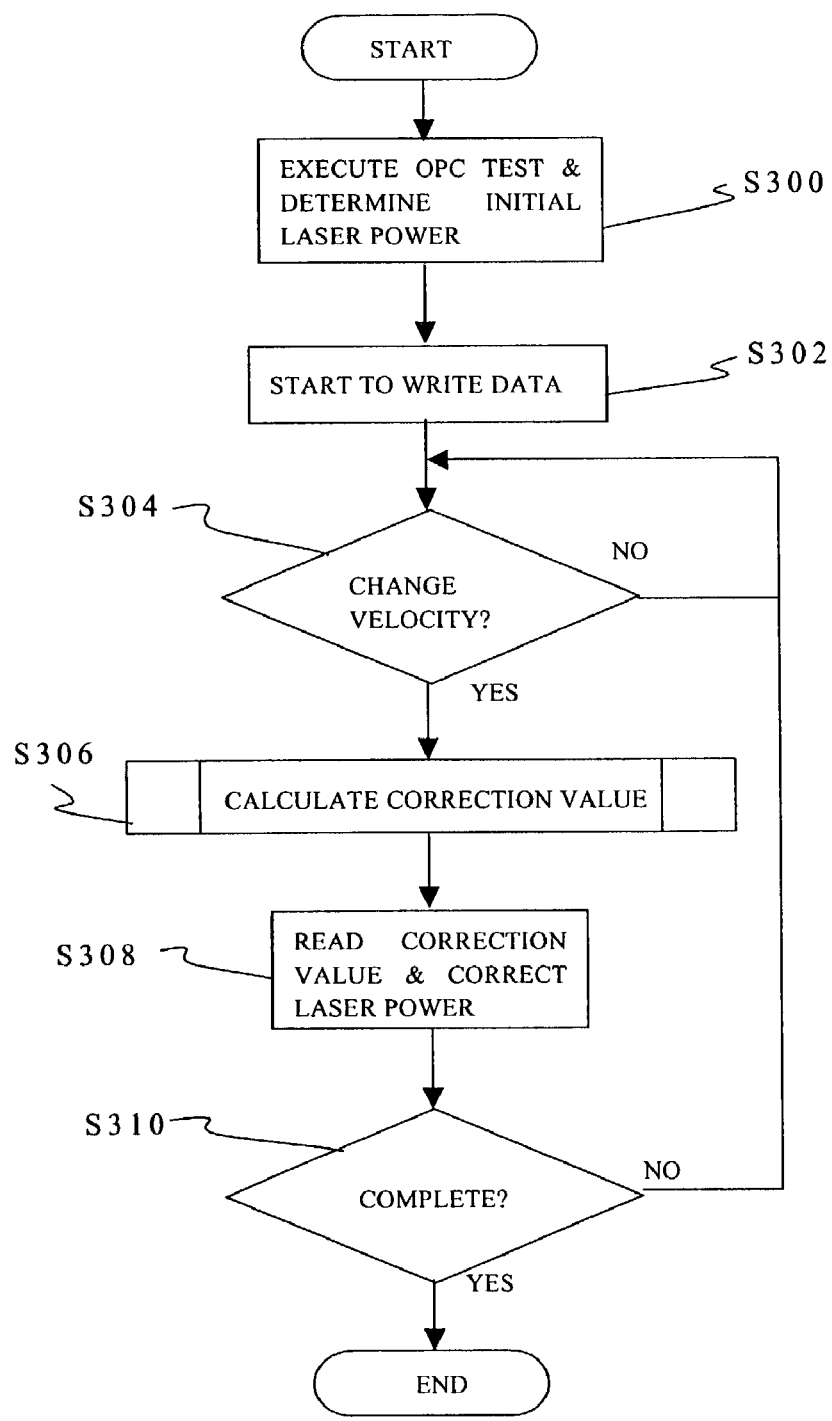
FIG. 8 is a flow chart showing action of the optical disk player of the third embodiment.

In FIG. 8, at a step S300, the CPU 24 reads data, e.g., the type of optical disk, recorded in an ATIP of the optical disk 10 by the optical puck-up 11, when the optical disk 10 is set to write data thereon. The data in the ATIP were written by a manufacturer before shipment.

The CPU 24 retrieves the recommended laser power P0 corresponding to the type of the optical disk 10 from the data table Y1.

The CPU 24 executes the OPC test with the recommended laser power P0 and determines the initial laser power P1 for starting to write data on the optical disk 10.

At a step S302, the CPU 24 starts to write data with the laser power P1.

At a step S304, if the linear velocity is not changed, data are continuously written with the same laser power, if the linear velocity is changed, the CPU 24 goes to a step S306.

At the step S306, the power correction value, which will be added to the current laser power, is calculated The steps of calculating the correction value will be explained with reference to FIG. 9.

At a step S400, the thermo sensor 15, e.g., a thermistor, measures the present temperature "T" around the laser diode 12.

Then the thermo sensor 15 sends the signals indicating the measured temperature to the CPU 24. With this action, the CPU 24 can know the present temperature around the laser diode 12. Then, the CPU 24 executes different steps according to the measured temperature "T".

At a step S402, if the temperature stage is $\alpha<T<\beta$, the CPU 24 goes to steps S404 and S412; if the temperature stage is $\beta<T<\gamma$, the CPU 24 goes to steps S406 and S414; if the temperature stage is $\gamma<T<\delta$, the CPU 24 goes to steps S408 and S416; if the temperature stage is $\delta<T<\epsilon$, the CPU 24 goes to steps S410 and S418.

At the step S412, the CPU 24 selects the temperature coefficient $\alpha1$ or $\alpha2$ corresponding to the temperature stage $\alpha<T<\beta$ from the data table Y2. Then, the standard correction value $\alpha1$ or $\alpha2$, which has been read from the data table Y1, is multiplied by the coefficient $\alpha1$ or $\alpha2$ at a step S420.

At the step S414, the CPU 24 selects the temperature coefficient $\alpha1$ or $\alpha2$ corresponding to the temperature stage $\beta<T<\gamma$ from the data table Y2. Then, the standard correction value a1 or a2, which has been read from the data table Y1, is multiplied by the coefficient $\alpha1$ or $\alpha2$ at a step S422.

At the step S416, the CPU 24 selects the temperature coefficient $\alpha1$ or $\alpha2$ corresponding to the temperature stage $\gamma<T<\delta$ from the data table Y2. Then, the standard correction value a1 or a2, which has been read from the data table Y1, is multiplied by the coefficient $\alpha1$ or $\alpha2$ at a step S424.

At the step S418, the CPU 24 selects the temperature coefficient $\alpha1$ or $\alpha2$ corresponding to the temperature stage $\delta<T<\epsilon$ from the data table Y2. Then, the standard correction value a1 or a2, which has been read from the data table Y1, is multiplied by the coefficient $\alpha1$ or $\alpha2$ at a step S426.

The optimum power correction value corresponding to the present temperature "T" is calculated by the steps S420–S426.

Upon calculating the optimum power correction value, the CPU 24 goes to the step S308 (see FIG. 8).

At the step S308, the CPU 24 controls the APC circuit 16 to add the calculated correction value A1 or A2 to the present laser power.

At a step S310, writing data is completed if all data have been written on the optical disk 10.

In the third embodiment, the standard correction values and the temperature coefficients are stored in the same memory means 26, but they may be stored separate memory means.

In the above described embodiments, the linear velocity is changed between 16×, 20× and 24×, but the linear velocity is not limited to the embodiments.

The invention may be embodied in other specific forms without departing from the spirit or essential characteristics thereof. The present embodiments are therefore to be considered in all respects as illustrative and not restrictive, the scope of the invention being indicated by the appended claims rather than by he foregoing description and all changes which come within the meaning and range of equivalency of the claims are therefore intended to be embraced therein.

What is claimed is:

1. A method of controlling a writing laser power of a zone Constant Linear Velocity (CLV) type optical disk player, in which a linear velocity of writing data is accelerated, by stages, toward an outer edge of an optical disk, said method comprising:
    reading data about the optical disk from an ATIP of the optical disk;
    reading a stored recommended laser power of the disk based on the data read from the ATIP of the optical disk;
    writing test data with increasing and decreasing laser power with respect to the read recommended laser power;
    reading the written test data so as to calculate an inclination value "k" of an up-down symmetry "β" of a light intensity waveform with respect to a variation of the laser power;
    comparing the inclination value "k" with two stored values "x" and "y" (x<y) so as to judge that a temperature condition is a Low Temperature when k>y, the temperature condition is an Ordinary Temperature when x<k<y, or the temperature condition is a High Temperature when k<x; and
    controlling the laser power based on a correction value, which corresponds to the judged temperature condition and a changed linear velocity, when the linear velocity of writing data is changed.

2. The method according to claim 1,
    wherein the correction value is calculated by multiplying a standard correction value, which has been previously determined based on a type of the optical disk without considering temperature, by a temperature coefficient, which has been previously determined, when the linear velocity is changed.

3. A zone Constant Linear Velocity (CLV) type optical disk player, in which a linear velocity of writing data is accelerated, by stages, toward an outer edge of an optical disk, said disk player comprising:
    a laser diode for irradiating a laser beam;
    laser control means for changing a laser power of the laser diode for writing data on the optical disk when the linear velocity is changed; and
    memory means for previously storing a plurality of the correction values of the laser power based on types of optical disks, temperature of writing data and changed linear velocities,
    wherein a correction value of the laser power, which has been previously determined, is added to the laser power when the linear velocity is changed, and wherein the laser control means:

reads data about the optical disk from an ATIP of the optical disk, reads a stored recommended laser power of the disk based on the data read from the ATIP of the optical disk, writes test data with increasing and decreasing laser power with respect to the read recommended laser power, reads the written test data so as to calculate an inclination value "k" of an up-down symmetry "β" of a light intensity waveform with respect to a variation of the laser power, compares the inclination value "k" with two stored values "x" and "y" (x<y) so as to judge that a temperature condition is a Low Temperature when k>y, the temperature condition is an Ordinary Temperature when x<k<y, or the temperature condition is a High Temperature when k<x, reads a correction value, which corresponds to the judged temperature condition and a changed linear velocity, from the memory means when the linear velocity of writing data is changed, and controls the laser power by increasing the laser power of the laser diode on the basis of the correction value.

4. An optical disk player, comprising:

a laser diode configured to irradiate a laser beam onto an optical disk; and a control processor configured to accelerate a linear velocity of the optical disk, by stages, toward an outer edge of the optical disk when writing data onto the optical disk, a laser control circuit configured to change a laser power of the laser diode for writing data on the optical disk when the control processor changes the linear velocity of the optical disk;

a memory configured to store a previously determined correction value, which is added to the laser power when the control processor changes the linear velocity of the optical disk, wherein the memory stores a plurality of the correction values of the laser power based on different types of optical disks, a temperature when writing data and changed linear velocities, and wherein the laser control circuit:

reads data about the optical disk from an ATIP of the optical disk, reads a stored recommended laser power of the disk based on the data read from the ATIP of the optical disk, writes test data with increasing and decreasing laser power with respect to the read recommended laser power, reads the written test data so as to calculate an inclination value "k" of an up-down symmetry "β" of a light intensity waveform with respect to a variation of the laser power, compares the inclination value "k" with two stored values "x" and "y" (x<y) so as to judge that a temperature condition is a Low Temperature when k>y, the temperature condition is an Ordinary Temperature when x<k<y, or the temperature condition is a High Temperature when k<x, reads the correction value, which corresponds to the judged temperature condition and a changed linear velocity, from the memory means when the linear velocity of writing data is changed, and controls the laser power by increasing the laser power of the laser diode on the basis of the correction value.

* * * * *